United States Patent [19]
Huchital et al.

[11] 4,032,862
[45] June 28, 1977

[54] HIGH POWER ELECTRODELESS GAS ARC LAMP FOR PUMPING LASERS

[75] Inventors: David A. Huchital, Trumball; George N. Steinberg, Westport, both of Conn.

[73] Assignee: The Perkin-Elmer Corporation, Norwalk, Conn.

[22] Filed: June 17, 1975

[21] Appl. No.: 587,670

Related U.S. Application Data

[63] Continuation-in-part of Ser. No. 442,976, Feb. 14, 1974, Pat. No. 3,909,736.

[52] U.S. Cl. ............................ 331/94.5 P; 330/4.3; 315/248; 315/284; 313/197; 313/183
[51] Int. Cl.² .......................................... H01S 3/092
[58] Field of Search ................. 331/94.5 P, 94.5 D; 330/4.3; 313/183, 197, 201, 291, 161; 315/248, 241, 284, 330

[56] References Cited

UNITED STATES PATENTS

| 3,172,056 | 3/1965 | Stitch | 331/94.5 P |
| 3,248,548 | 4/1966 | Booth et al. | 331/94.5 X |
| 3,500,118 | 3/1970 | Anderson | 315/248 |
| 3,787,705 | 1/1974 | Bolin | 331/94.5 P |

OTHER PUBLICATIONS

Andreev et al, Soviet Physics–Tech. Physics, vol. 14, No. 6, Dec. 1969, pp.769–773.
Hattori et al, Japanese Journal of Applied Physics, vol. 6, No. 3, Mar. 1967, pp. 356–363.
Goldsborough et al, Applied Physics Letters, vol. 8, No. 6, 15 Mar. 1966, pp. 137–139.
Harvey, "Coherent Light," pub. by Wiley–Interscience, New York, 1970 Chapter 8, pp.346–359, 381–383.
Stefanov, Comptes Rendus, Acad. Sci., Bulgare, vol. 19, No. 6, 1966, pp. 483–485.
Andreev et al, Optics & Spectroscopy, vol. 23, No. 5, pp. 425–427, 1967.

*Primary Examiner*—Robert J. Webster
*Attorney, Agent, or Firm*—S. A. Giarratana; F. L. Masselle; J. D. Crane

[57] ABSTRACT

An electrodeless RF excited gas arc lamp for pumping a laser has a lamp envelope in the form of a loop having a continuous bore containing krypton, xenon or argon. Sufficient RF power to maintain a plasma in the gas in the loop is provided by a coil around its circumference so that it is linked by the flux generated by RF voltage through the coil. The laser rod to be pumped is mounted adjacent the loop. A diffuse reflector surrounds the lamp and laser rod to reflect back toward the rod light which does not impinge directly on the rod as well as any impinging light not initially absorbed by the rod.

14 Claims, 3 Drawing Figures

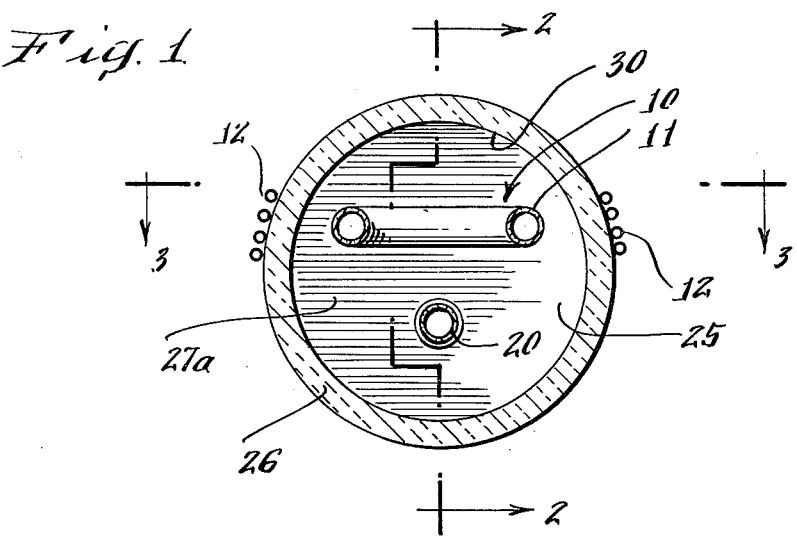
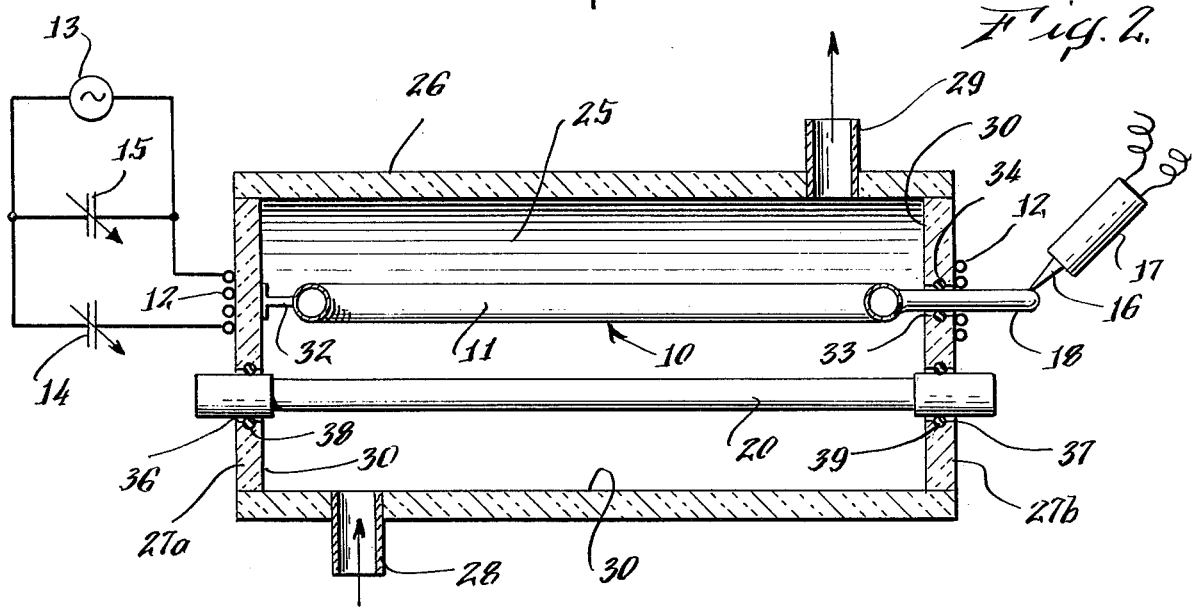
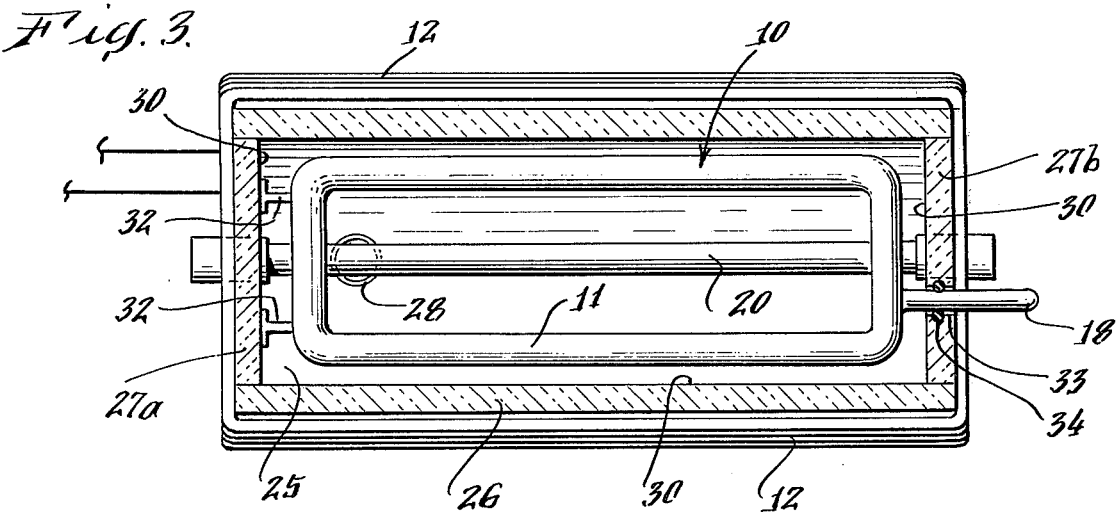

HIGH POWER ELECTRODELESS GAS ARC LAMP FOR PUMPING LASERS

This is a continuation-in-part of copending U.S. application Ser. No. 442,976 filed Feb. 14, 1974 for "RF Excited Electrodeless Gas Arc Lamp For Pumping Lasers", now U.S. Pat. No. 3,909,736.

BACKGROUND OF THE INVENTION

The present invention is an RF excited gas arc lamp, such as a krypton arc lamp, capable of producing light of sufficient intensity (watts per cm$^2$) to pump a laser, such as Nd:YAG and Nd:YAlO$_3$ lasers which are pumped with krypton lamps, and which emit copious light in the near infrared portion of the spectrum.

As discussed in the aforementioned application, a particular object of the invention described therein, and a particular object of the present invention, is to provide an arc lamp structure, particularly adapted for krypton arc lamps, that does not have electrodes and thereby avoids the problems, expense and danger of previously used krypton lamps which have electrodes and problems caused by the electrodes, such as rupturing of the seals around the electrodes and sputtering and evaporation of cathode material onto the walls of the envelope.

The present invention has the objects and advantages set forth in the foregoing application and in addition has as its own principal object to provide an improved lamp structure and mounting arrangement relative to the laser rod to be pumped which maximizes the effective surface area of the lamp for laser pumping while minimizing the overall size of the lamp and the assembly for mounting the lamp and laser rod in a laser unit. For example, for a laser unit of a given overall size, a unit embodying the present invention can be adapted to produce an output on the order of more than four times the output from a laser unit of the same overall size constructed in accordance with the annular lamp construction (illustrated by FIG. 1 herein) disclosed in the aforementioned application.

Arc lamps of the type under consideration, and as disclosed by the aforementioned parent application consist essentially of an envelope, suitably of fused silica containing an inert gas, such as krypton, xenon and argon, which is excited by RF voltage applied across a coil around or adjacent to the envelope.

As disclosed in the aforementioned parent application RF voltage (defined for present purposed as voltage having a frequency in the range of from 1.0 to 100 megacycles per second) can effectively be coupled into gas in a lamp envelope and maintain a plasma that provides a sufficiently intense and stable light output to pump a laser if there is provided an appropriate combination of the pressure of the gas, geometry of the envelope and power supply circuitry.

The geometry of an arc lamp envelope is generally expressed in terms of characteristic length, $\Lambda$, which is a function of the length and of the lateral dimensions of the envelope and which refers to the average length or distance ions and electrons of the gas atoms travel from the points of excitation to points of impact with a wall of the envelope. In the context of the invention disclosed in the parent application, it is generally desired to have the characteristic length of the envelope and hence its surface areas as small as possible in order to maximize the intensity of light output per unit area of the envelope.

The impedance Z, of the gas plasma is approximately proportional to the mth power of the pressure P divided by the characteristic length $\Lambda$, $Z \alpha \ P_m/\Lambda$, where $m$ is a factor representing the dependence of impedance on pressure for the specific gas. The value of $m$ is close to one; its established value for particular inert gases can be found in tables of impedance on pressure in current reference texts on inert gases for arc lamps. The impedance is critical in the sense that if it is too high, it would be commercially impractical to provide an impedance matching circuit capable of coupling in sufficient RF power to start or maintain the plasma, and the power losses in the coupling circuit would be impractically high.

If the characteristic length is too large, the lamp would be impractical for laser pumping because a major portion of the emitted light could not practically be directed into the laser rod and would be lost; also the intensity of light output per unit of lamp envelope surface area would be reduced. The pressure is critical in that if it is too low, the amount of light radiated is insufficient to provide the required intensity of light; if the pressure is too high, the plasma impedance increases, which increases the difficulty of coupling power in.

The value of the characteristic length $\Lambda$, is determined by the particular configuration of the envelope and by the dimensions of that configuration. These are separate formulae for determining the characteristic lengths of envelopes of different geometric configurations, e.g. spheres, cylinders, annulae, and square sided configurations, the weights given the lateral dimensions, i.e., radii, width, or height, and the weights given the lengths in these formulae vary in accordance with the particular configuration being considered. For example, the general definitions of the characteristic lengths of several representative lamp envelope configurations disclosed and described in the parent application are as follows:

1. For a cylindrical envelope of length L and radius R, $$\frac{1}{\Lambda^2} = \left(\frac{\pi}{L}\right)^2 + \left(\frac{2.405}{R}\right)^2$$

2. For a spherical envelope of radius R, $$\frac{1}{\Lambda^2} = \left(\frac{\pi}{R}\right)^2$$

3. For an annular envelope of length L, outer radius $R_o$ and inner radius $R_1$, $$\frac{1}{\Lambda^2} \approx \left(\frac{\pi}{L}\right)^2 + \left(\frac{2.4}{R_o - R_i}\right)^2$$

The critical lamp envelope geometry for constructing lamps of this invention is geometry which will have a characteristic length within a particular range. As indicated by the formulae above, the one most significant dimension in determining the characteristic length of an envelope of any configuration is the width of the envelope between its closest walls, and FIGURES for this width and for the length of the envelope (i.e., the largest dimension) will, if inserted in the characteristic length formula for the geometry involved (omitting values for any additional dimensions referred to) give a characteristic length value which is a sufficiently close approximation of the characteristic length to construct lamp envelopes having the requisite characteristic for providing lamps of the invention disclosed in the parent application. Accordingly the critical dimensions of lamp envelopes are the length and the "effective width" which is defined in the parent application as the width of the envelope between its closest walls; in the annular envelope disclosed in the parent application the effective width is the width of the annulus (i.e., which is difference between the inner and outer radii).

The present application discloses that an RF excited inert gas arc lamp which will produce sufficiently intense light to pump a laser and in which impedance matching and sufficient input power are supplied by a fairly simple circuit and a single voltage source is provided by a lamp in which the pressure of the gas, in cold condition before a plasma is generated therein, is in the range of from about 0.5 to about 20 atmospheres and the effective width is in the range of from about 1 to about 30 mm., while its length is not more than about 150 mm.

The power supply circuit for practical operation of the lamp is adjustable to resonance and to match the impedance of plasma in the gas, and may be provided by one of a number of different circuits, for example, a single voltage source applied through a T network or parallel resonant circuit, or multiple voltage sources, each with a different range of impedances, which may be alternatively applied for substantially matching successively the cold gas impedance and then the impedance of the plasma. For simplicity and economy it would be desirable to be able to utilize a single voltage source and in practice a single voltage source is effectively applied for start up and for maintaining a plasma by a circuit consisting of two variable capacitors respectively in series and in parallel between the RF voltage supply and the coil. In operation, a plasma is ignited in the gas by any suitable means. A simple method is to momentarily energize a Tesla coil whose probe is placed close to the exterior of the lamp envelope. After a plasma is ignited in the gas, a stabilized high current, low voltage for maintaining the discharge is provided by matching the impedance of the power supply circuit to the impedance of the discharging plasma.

The lamp envelope is made a size compatible with the size of the laser rod and is mounted adjacent to the laser rod for as much of the lamp output as possible to impinge on the rod. In operation the lamp generates a great deal of heat which might damage the laser rod, therefore, the usual lamp and laser combination will ordinarily include means for cooling the rod, such as by mounting the lamp envelope and laser rod in a chamber through which water or other light transmissive coolant is circulated.

In addition, in order to have the maximum possible amount of light from the lamp directed into the laser rod, a reflector is placed to direct back toward the rod that portion of light from the lamp which does not fall directly on the rod and which would otherwise be lost. The reflector is preferably a diffuse reflector unless the lamp and rod mounting configuration is such that the reflector can be arranged to focus reflected light onto the laser rod.

BRIEF DESCRIPTION OF THE INVENTION

An arc lamp in accordance with this invention is based generally on the characteristic length formula and effective width criteria defined in the parent application for a cylindrical lamp envelope of length L and radius R. In order to increase the power output of a lamp and laser rod unit of the annular type of construction disclosed in the parent application the radial dimensions would have to be increased in direct proportion to the increase in power level desired.

In the parent annular lamp configuration, the annular lamp envelope is elongated in the axial direction, so as to provide a cylindrical annular compartment having an elongated axial bore through which the laser rod is mounted. In considering the problem of providing a laser and pumping lamp to produce a higher power output (eg. greater than 30 watts) while minimizing as much as possible the increase in overall size of the unit, it was observed that in the parent annular configuration the densest part of the plasma generated in the elongated annulus occurred in a narrow ring around the mid-portion of the length of the axially elongated annular chamber.

The lamp structure and mounting arrangement relative to a laser rod to be pumped thereby in accordance with the present invention which ultimately derived from the foregoing observation consists in its broadest aspect of a lamp envelope in the form of a transparent loop suitably of fused silica, having a continuous bore containing an inert gas, at a cold pressure of the lamp of from about 0.5 to about 20 atmospheres. The loop is a tubular section bent into the form of a continuous loop; it incorporates the critical characteristic length dimensions explained above and is constructed in accordance with the characteristic length formula for a cylindrical envelope wherein the lenght L is the mean circumference of the loop and the radius R is the radius of the tubular section of which the loop is formed. The diameter of the tubing, i.e. the effective width is made in the range of from 1 to 10 mm and the length or circumference of the loop is made large enough for its largest diameter to correspond at least approximately, to the length of a laser rod to be pumped by the lamp. A coil is arranged circumferentially around the tubular loop for the loop to be in the flux generated by RF current passing through the coil from a source which is selected to supply a level of RF power through the coil that will maintain a plasma in the tube forming the loop. The arrangement is adapted for the laser rod that is to be pumped by the lamp to be mounted adjacent to the loop; the laser rod may be mounted parallel to the plane of the loop or it may extend obliquely through the center of the loop.

Provision is customarily made to cool the laser rod to prevent heat damage to it and for this purpose the lamp and laser rod are suitably mounted in a closed chamber through which a light transmissive cooling fluid, such as water, is circulated.

In order to maximize the effective application of the light from the lamp to pump the laser, the lamp and laser rod are preferably surrounded by a reflecting surface to direct back to the laser rod any light from the lamp which does not impinge directly on, or is not immediately absorbed by, the laser rod. The reflecting surface is preferably a diffuse reflector and may be provided by making reflective the interior surfaces of the cooling chamber in which the lamp and laser rod are customarily mounted.

In instances when the laser rod contains impurities that absorb some wavelengths of the light produced by the lamp, this absorption may cut down the efficiency of the laser. In this case it may, therefore, be desirable to filter out the wavelengths that would be absorbed by such impurities and a filter for this purpose may be provided in any suitable position, around the rod, for example to filter the light impinging on the rod.

The critical diameter of the bore of the tubing from which the loop is made is in a range of from 1 to 10 mm, and represents the possible range in which a suitably practical and efficient lamp would be provided in accordance with this invention for pumping a laser; the most effective diameter range of a krypton lamp for pumping an Nd: YAG Nd:YA1O$_3$ laser rod would be a diameter between 3 to 8 mm.

The foregoing diameter, which is suitably termed the "effective diameter" is in accordance with the characteristic length formula for a cylindrical envelope as discussed above, namely:

$$\frac{1}{\Lambda^2} = \left(\frac{\pi}{L}\right)^2 + \left(\frac{2.405}{R}\right)^2$$

where

L is the mean circumference of the loop and

R is one half the diameter D of the bore of the tubing forming the loop.

In this instance L is at least several times greater than R so that the characteristic length is approximately equal to R/2.405 (the value for L being a relatively insignificant factor) and the value of R is the essential factor.

DESCRIPTION OF THE DRAWINGS

An RF excited gas arc lamp for pumping a laser and such a lamp and a laser rod mounted as a unit, in accordance with the present invention are described in more detail below with respect to the illustrative embodiment shown in the accompanying drawings in which:

FIG. 1 is a lateral cross sectional view, partly schematic, of an RF excited gas arc lamp and laser rod unit embodying the invention;

FIG. 2 is a longitudinal cross sectional view, partly schematic along the line 2—2 of FIG. 1; and FIG. 3 is a longitudinal cross sectional view, along the line 3—3 of FIG. 1.

DETAILED DESCRIPTION

Referring to the drawings the lamp envelope of an RF excited gas arc lamp 10 of this invention is a loop made of tubing 11 of from about 1 to about 10 mm in diameter filled with an inert ionizable gas, such as krypton, xenon or argon, at a cold pressure of from about 0.5 to about 20 atmospheres.

The gas in the loop is excited by an RF voltage coupled into it by the coil 12 which is supported circumferentially around the loop constituting the lamp 10 so that it is in the flux generated by an RF voltage applies through the coil from a source 13, shown in FIG. 2.

The source 13 is adapted to supply sufficient RF power, e.g., 5 kilowatts at 30 megahertz, to maintain a plasma in the gas and to assist in the start up of the lamp. As previously mentioned, the impedance of the power supply circuit through the coil 12 should substantially match the impedance of the cold gas and then have its impedance adjusted to substantially match the impedance of a plasma in the gas. This is suitably provided by a network consisting of variable capacitors 14 and 15 connected respectively in parallel and in series in the circuit for adjusting the circuit to resonance when the operating voltage is applied to the coil at start up, before the plasma is ignited, and then, after the plasma is ignited, to adjust the impedance to match the impedance of the plasma.

For starting and operating the lamp, RF voltage from the source 13 is applied to the coil 12 and the circuit is adjusted to reasonance to means of the variable capacitors 14 and 15. A plasma is then ignited in the gas by applying an additional high voltage or a high voltage spark to the gas. This may be done in various ways; for example by a second coil around the envelope connected to another source of high voltage, but, as illustrated, a particularly simple method is to apply a high voltage spark to the gas by placing the probe 16 of a Tesla coil close to the envelope 10 and actuating the Tesla coil to produce a spark. The lamp 10 may suitably be provided with a thin hollow rod-like extension 18 to provide a convenient point to which to apply the probe 16. When the plasma ignited, the voltage in the plasma drops and the current increases, the impedance of the coil circuit is then adjusted by the variable capacitors 14 and 15 to substantially match the impedance of the plasma for maintaining the plasma discharge.

A laser rod 20 to be pumped by the lamp 10 is mounted adjacent the lamp in a position for a maximum amount of light from the lamp tube 11 to impinge on the rod. The particular shape of the loop formed by the tube is not critical, it may be any shape such as circular, elliptical, square, etc., best adapted to supply light to the laser rod 20, but as shown in the embodiment illustrated, a rectangular shape for the loop has proved particularly suitable. The laser rod 20, is then mounted to extend in the direction of the longest diameter of the loop, spaced slightly away from it and parallel to and approximately midway between the longer opposite sides of the loop. It will be appreciated, however, that the rod could be placed in other positions relative to the lamp. For example, it could be extended obliquely through the central opening of the loop.

For optimum laser power output for a given input to the lamp 10, the lamp is suitably made a size such that its longest dimension, its longest diameter in the embodiment shown, corresponds at least approximately to the length of the portion of the laser rod 20, through which the pumping light can enter.

As mentioned previously, some means is customarily provided for cooling the laser rod, and it is also desirable for optimum efficiency to provide a reflecting surface to reflect back to the rod 20 any light from the lamp 10 which does not impinge directly on the rod 20, or which is not immediately absorbed by the laser rod. These features are suitably provided in the embodiment illustrated by mounting the lamp 10 and laser rod 20 in a closed chamber 25. In the embodiment shown in the chamber 25 is suitably provided by a cylindrical shell or wall 26 closed by end caps 27a and 27b, cemented or otherwise sealed into the ends of the cylinder. The particular geometric shape of the chamber is not critical, however, the chamber 25 is provided with an inlet 28 and an outlet 29 through the walls for circulating a cooling fluid, suitably water, from a source not shown, through the chamber.

The reflecting surfaces may be provided by making the interior surfaces 30 of the chamber 25 reflective. A reflective coating may be applied to the interior surfaces 30, and, as previously mentioned, the reflecting surfaces will normally be such as to provide diffuse reflection. The materials of which the chamber and reflector are made are not critical, but in the embodiment shown the cylinder 26 and end caps 27a, 27b are made of a ceramic material, such as alumina, barium sulfate or magnesium oxide, so that the interior surfaces of the chamber will, by the nature of the material, provide the diffuser reflecting surfaces desired. A filter, not shown, may be provided in the chamber between the lamp 10 and laser rod 20 or around the laser rod, for filtering out unwanted wavelengths of the light from the lamp that could be absorbed by impurities in the laser rod.

The lamp 10 may be mounted in position in the chamber by projecting feet 32 at one end of the lamp (the left end as illustrated in the drawings) cemented to the chamber end cap 27a. At the other end of the chamber the rod-like extension 18 of the lamp extends out through an opening 33 in the end cap 27b, and is sealed therethrough by suitable means such as by an "0" ring 34. The extension 18 is thus accessible outside the chamber for starting the lamp by means of a Tesla coil 17, by applying the coil probe 16 to the extension 18, as described above. Additionally the extension 18 provides support for the right end of the lamp 10.

The ends of the laser rod must, of course, be exposed to the outside through the walls of the chamber 25. This, and the mounting of the rod in position adjacent the lamp in the chamber are provided by having the opposite ends of the laser rod 20, or extension thereof, supported and sealed through openings 36 and 37 in the end caps 27a and 27b, respectively, by "0" rings 38 and 39.

In practice, a krypton arc lamp and Nd:YAG laser rod combination constructed in accordance with the embodiment described above had a fused silica lamp 10 whose diameter was on the order of 5 mm outside with a tube wall thickness of on the order of 1 mm. The longest diameter of the loop was on the order of 5 cm; the shortest diameter was on the order of 2.5 cm. The Nd:YAG laser rod 20 was approximately the longest length of the loop, not including end shields on the rod which extended through the end caps of the chamber, and an application of from 3–5 5 kilowatts of input RF power produced a laser output of greater than 50 watts.

What is claimed is:

1. An electrodeless cw arc lamp for pumping a laser comprising:
    a radiation transparent lamp envelope in the form of a closed loop having a continuous bore, a major axis and a minor axis, the bore diameter being in the range of from about 1 to about 10 mm, said envelope containing an inert ionizable gas at a cold pressure of from about 0.5 to about 20 atmospheres, said major axis of the loop corresponding substantially to the length of the laser rod to be pumped by the lamp;
    a coil surrounding said lamp envelope with no portion thereof being disposed between said envelope and the laser rod to be pumped thereby, said coil being adapted to receive an RF current and produce a flux in response thereto, said coil being disposed so that said lamp envelope is in the flux; and
    mounting means for positioning a laser rod adjacent said lamp envelope with the rod extending in a direction substantially the same as said major axis of said loop so that light from the tube will impinge directly on a laser rod positioned by said mounting means.

2. The lamp of claim 1 including reflecting means surrounding said lamp envelope and said mounting means and a laser rod mounted by said mounting means, said reflecting means being operative to reflect light not directly impinging on said laser rod in a direction toward said laser rod.

3. The lamp of claim 1 including means operatively connected to said coil for adjusting the impedance of the circuit including said coil first to match the impedance of the cold gas in said envelope and then to match the impedance of a plasma ignited in the gas within said envelope.

4. The lamp of claim 1 including a chamber incorporating said mounting means and including reflective interior surfaces, said envelope being disposed inside said chamber.

5. The lamp of claim 4 wherein said interior surfaces have a diffuse reflective coating.

6. The lamp of claim 4 wherein said chamber is constructed of a ceramic material.

7. The lamp of claim 4 wherein said chamber includes an inlet and an outlet communicating with the chamber interior to permit cooling fluid to be circulated through said chamber.

8. The lamp of claim 4 wherein said coil is disposed exterior to said chamber.

9. An electrodeless cw arc lamp and a laser rod pumped thereby comprising:
    a radiation transparent lamp envelope in the form of a closed loop having a continuous bore, a major axis and a minor axis, the diameter of the bore being in the range of from about 1 to about 10 mm, said envelope containing a gas from the group consisting of krypton, xenon and argon at a cold pressure of from about 0.5 to about 20 atmospheres, the major axis of the loop having a length of approximately the length of a laser rod to be pumped by the lamp;
    a coil surrounding said lamp envelope with no portion thereof being disposed between said envelope and the laser rod to be pumped thereby, the loop for the said coil being adapted to receive an RF current and produce a flux in response thereto, said coil being disposed so that said lamp envelope is in the flux;
    means operatively connected to said coil for adjusting the impedance of the circuit including said coil first to match the impedance of the cold gas in the tube and then to match the impedance of a plasma ignited in the gas;
    a laser rod mounted adjacent to said envelope with the length of the rod extending in the direction substantially the same as the direction of the major axis of said envelope permitting light from the tube to impinge directly on the laser rod; and
    reflecting means surrounding said lamp envelope and said laser rod for reflecting light which does not impinge directly on said laser rod in a direction toward said laser rod.

10. The lamp and laser rod of claim 9 including a chamber surrounding said envelope and said laser rod, said reflecting means comprising a reflective coating on the interior surfaces of said chamber.

11. The lamp and laser rod of claim 10 in which said reflective coating is a diffuse reflector.

12. The lamp and laser rod of claim 7 in which said chamber is closed and includes an inlet and an outlet permitting cooling fluid to be circulated therethrough.

13. The lamp and laser rod of claim 11 in which said chamber is formed of ceramic material.

14. The lamp and laser rod of claim 9 in which the laser rod is selected from the group consisting of ND:YAG and ND:YA10 laser rods.

* * * * *

UNITED STATES PATENT AND TRADEMARK OFFICE
CERTIFICATE OF CORRECTION

PATENT NO. : 4,032,862
DATED : June 28, 1977
INVENTOR(S) : David A. Huchital & George N. Steinberg It is certified that error appears in the above-identified patent and that said Letters Patent are hereby corrected as shown below:

Column 2, line 9 after "impedance" insert -- dependence --

Column 7, line 33 after "rod" insert --20--.

Signed and Sealed this

Eleventh Day of October 1977

[SEAL]

Attest:

RUTH C. MASON
Attesting Officer

LUTRELLE F. PARKER
Acting Commissioner of Patents and Trademarks